United States Patent
Shook

(10) Patent No.: US 11,148,809 B2
(45) Date of Patent: Oct. 19, 2021

(54) SYSTEMS AND METHODS FOR PREVENTING THE STOWAGE OF EJECTION SEAT ARM CATCHER MEMBERS

(71) Applicant: GOODRICH CORPORATION, Charlotte, NC (US)

(72) Inventor: Ryan Shook, Rockford, IL (US)

(73) Assignee: Goodrich Corporation, Charlotte, NC (US)

( * ) Notice: Subject to any disclaimer, the term of this patent is extended or adjusted under 35 U.S.C. 154(b) by 115 days.

(21) Appl. No.: 16/687,381

(22) Filed: Nov. 18, 2019

(65) Prior Publication Data

US 2021/0147084 A1    May 20, 2021

(51) Int. Cl.
*B64D 11/06* (2006.01)

(52) U.S. Cl.
CPC ...... *B64D 11/0616* (2014.12); *B64D 11/0644* (2014.12); *B64D 11/0689* (2013.01)

(58) Field of Classification Search
CPC ............... B64D 25/10; B64D 11/0616; B64D 11/0644; B64D 11/0689; B64D 11/06
See application file for complete search history.

(56) References Cited

U.S. PATENT DOCUMENTS

| | | | |
|---|---|---|---|
| 4,247,064 A | 1/1981 | Schulman et al. | |
| 4,580,745 A | 4/1986 | Brophy | |
| 4,871,131 A | 10/1989 | Bernier et al. | |
| 6,299,103 B1 | 10/2001 | Shope et al. | |
| 8,191,830 B2 | 6/2012 | Mastrolia | |
| 8,485,471 B2 | 7/2013 | Patterson et al. | |
| 2011/0114790 A1* | 5/2011 | Patterson | B64D 25/02 244/122 AG |

* cited by examiner

*Primary Examiner* — Justin M Benedik
(74) *Attorney, Agent, or Firm* — Snell & Wilmer L.L.P.

(57) ABSTRACT

The present disclosure provides an arm catcher system for an aircraft ejection seat. The arm catcher system may comprise a first support member configured to rotate in a first direction to be deployed in response to an ejection event and a first persistent locking mechanism coupled to the first support member, wherein the first persistent locking mechanism is configured to allow the support member to rotate in the first direction and configured to prevent the first support member from rotating in a second direction opposite the first direction.

20 Claims, 11 Drawing Sheets

SYSTEMS AND METHODS FOR PREVENTING THE STOWAGE OF EJECTION SEAT ARM CATCHER MEMBERS

FIELD OF THE DISCLOSURE

The present disclosure relates to aircraft ejection systems, and more particularly, to systems and methods for preventing the inadvertent stowage of ejection seat arm catcher support members.

BACKGROUND OF THE DISCLOSURE

Certain aircraft may contain ejection seats configured to allow a pilot to quickly exit the aircraft during an adverse event. Upon ejection from the cockpit, the pilot enters the wind stream at the surface of the aircraft canopy. The pressure imposed on the pilot upon entering the wind stream (i.e., during windblast) acts to move the pilot's arms rearward. Current ejection seats may include limb restraint systems configured to reduce or prevent limb flail injuries during the ejection sequence. However, the hole and/or fracture pattern created by canopy fracturing systems may not be large enough to allow a deployed arm restraint system to pass through the canopy without contacting full-strength, or unfractured, portions of canopy material. Contact with unfractured canopy material may damage the arm restraint system or otherwise cause the arm restraint system to not be in the proper position when the pilot enters the wind stream. Further, contact with the unfractured canopy material may contact the pilot resulting in potential injury to the pilot.

SUMMARY OF THE DISCLOSURE

An arm catcher system for an aircraft ejection seat may comprise a first support member configured to rotate in a first direction to be deployed in response to an ejection event, and a first persistent locking mechanism coupled to the first support member, wherein the first persistent locking mechanism is configured to allow the first support member to rotate in the first direction and configured to prevent the first support member from rotating in a second direction, the second direction being opposite the first direction.

In various embodiments, the arm catcher system may further comprise a second support member and a second persistent locking mechanism coupled to the second support member, the second support member positioned below the first support member with respect to a seat frame. The arm catcher system may further comprise a third support member and a third persistent locking mechanism coupled to the third support member, the third support member positioned on an opposite side of the aircraft ejection seat as the first support member. The arm catcher system may further comprise a fourth support member and a fourth persistent locking mechanism coupled to the fourth support member, the fourth support member positioned below the third support member. The first persistent locking mechanism may comprise a sprag clutch. The first persistent locking mechanism may comprise a planetary ratchet and pawl device. The first persistent locking mechanism may comprise a ratchet and pawl device. The sprag clutch may comprise an inner race, an outer race, and a plurality of sprags disposed radially between the inner race and the outer race, wherein the first support member is coupled to the outer race and the inner race is coupled to a seat frame. The planetary ratchet and pawl device may comprise a gear, a pawl support, a pawl, and a biasing member, wherein the gear and the pawl support are mounted to a central pivot axis, wherein the biasing member is disposed between the pawl support and the pawl, wherein the gear is coupled to the first support member and the central pivot axis is mounted to a seat frame. The ratchet and pawl device may comprise a gear, a support, and a pawl, wherein the gear is mounted to a pivot axis of the support, wherein the pawl is mounted to a second pivot axis of the support, wherein the gear is coupled to the first support member and the support is mounted to a seat frame.

An aircraft ejection seat may comprise a seat frame an arm catcher system associated with the seat frame, the arm catcher system comprising a first support member configured to rotate in a first direction to be deployed in response to an ejection event, and a first persistent locking mechanism coupled to the first support member, wherein the first persistent locking mechanism is configured to allow the first support member to rotate in the first direction and configured to prevent the first support member from rotating in a second direction, the second direction being opposite the first direction, the first persistent locking mechanism coupled to the seat frame.

In various embodiments, the aircraft ejection seat may further comprise a second support member and a second persistent locking mechanism coupled to the second support member, the second support member positioned below the first support member with respect to the seat frame. The first persistent locking mechanism may comprise a sprag clutch. The first persistent locking mechanism may comprise a planetary ratchet and pawl device. The first persistent locking mechanism may comprise a ratchet and pawl device. The sprag clutch may comprise an inner race, an outer race, and a plurality of sprags disposed radially between the inner race and the outer race, wherein the first support member is coupled to the outer race and the inner race is coupled to a seat frame. The planetary ratchet and pawl device may comprise a gear, a pawl support, a pawl, and a biasing member, wherein the gear and the pawl support are mounted to a central pivot axis, wherein the biasing member is disposed between the pawl support and the pawl, wherein the gear is coupled to the first support member and the central pivot axis is mounted to a seat frame. The ratchet and pawl device may comprise a gear, a support, and a pawl, wherein the gear is mounted to a pivot axis of the support, wherein the pawl is mounted to a second pivot axis of the support, wherein the gear is coupled to the first support member and the support is mounted to a seat frame.

A method for manufacturing an aircraft ejection seat may comprise coupling a first support member to the aircraft ejection seat, the first support member configured to rotate in a first direction in response to an ejection event and coupling a first persistent locking mechanism to the first support member and to the aircraft ejection seat, the first persistent locking mechanism configured to allow the first support member to rotate in the first direction and configured to prevent the first support member from rotating in a second direction, the second direction being opposite the first direction.

In various embodiments, the first persistent locking mechanism comprises a sprag clutch.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with aircraft ejection systems. However, various aspects of the disclosed embodiments may be adapted for performance in a variety of other systems. As such, numerous applications of the present disclosure may be realized.

In order to at least partially mitigate damage to support members of an arm catcher system due to contact with a canopy or parts of a canopy, provided herein are support members mounted to or otherwise couple to a persistent locking mechanism, in accordance with various embodiments. The persistent locking mechanism may, in various embodiments, allow the support members to rotate or pivot from a stowed position to a deployed position but resist rotation or pivoting from a deployed position to a stowed position. Stated another way, in various embodiments, the persistent locking mechanism may allow for pivoting or rotation in one rotational direction only. Such a function may help ensure that the arm catcher system becomes fully deployed in the event one of the support members contacts the canopy and may also force portions of the canopy away from an ejection path of the seat, thereby preventing potential injury to a pilot caused by the pilot contacting the canopy.

Figure 1:
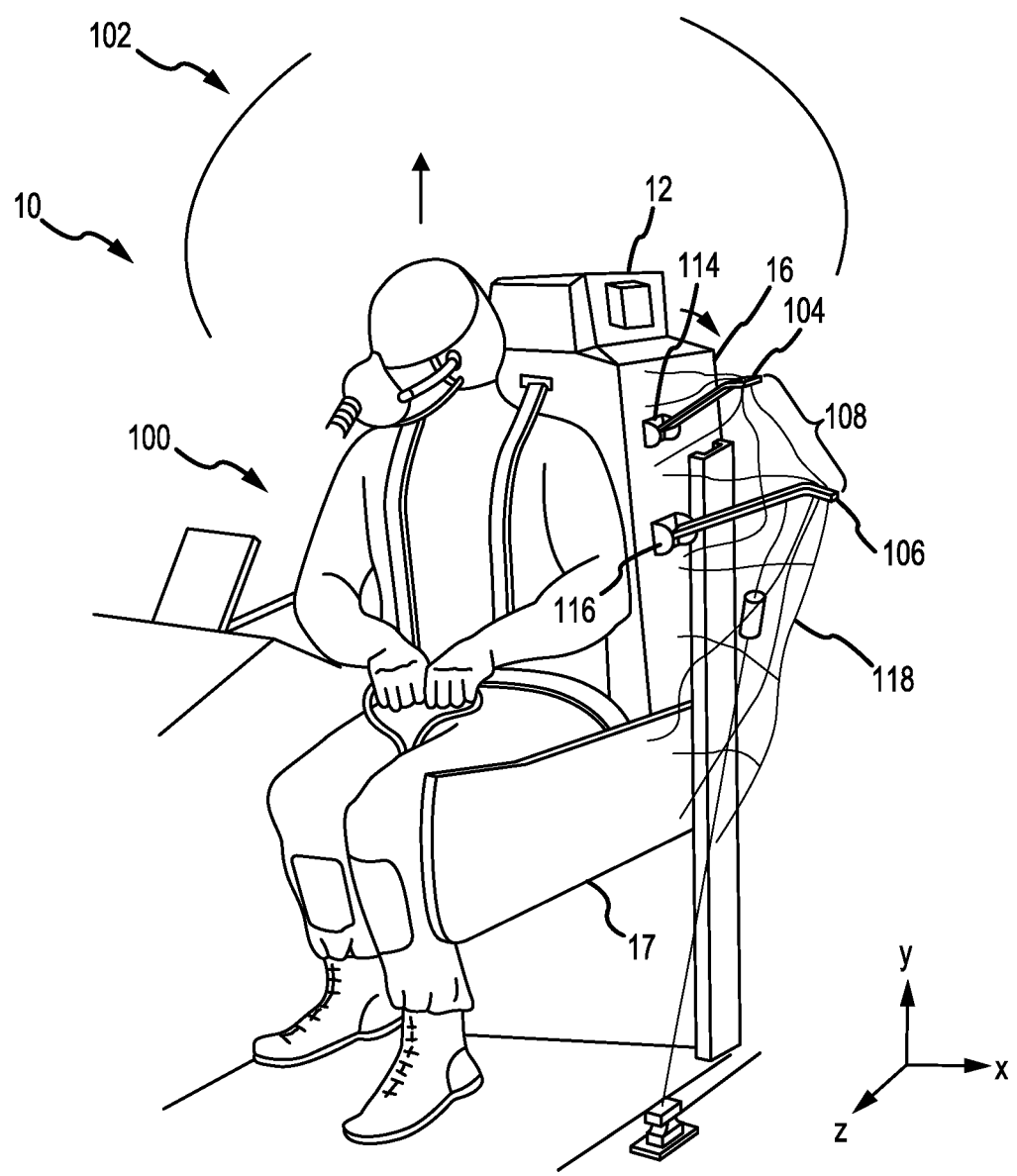
FIG. 1 illustrates a view of an ejection seat incorporating an arm catcher system after an ejection event has been initiated, but before a deployed position of the arm catcher system has been reached, in accordance with various embodiments.

Accordingly, with reference to FIG. 1, an ejection seat system 10 is illustrated in accordance with various embodiments. Ejection seat 100 may comprise a seat 12 having a seat pan portion 17 and a seat back portion 16. Seat 12 may be formed of any suitable material including aluminum alloys, titanium alloys and/or composite materials but is not limited in this regard and may comprise any suitable material. Ejection seat 100 may be launched conventionally by means of a catapult and a solid rocket motor which may propel ejection seat 100 out of the aircraft along a launch rail. Ejection seat 100 may be ejected along an intended ejection path and through a canopy 102, which may be removed completely or fractured to form the ejection path.

In various embodiments, ejection seat 100 may comprise one or more arm catcher systems, in accordance with various embodiments. Specifically, in various embodiments, ejection seat 100 may comprise a first arm catcher system 108 and, with momentary reference to FIGS. 2A and 2B, second arm catcher system 202, which is disposed opposite first arm catcher system 108 such that first arm catcher system 108 and second arm catcher system 202, when in the deployed position, may act to catch or otherwise contain the limbs of a pilot. First arm catcher system 108 may comprise an upper support member 104, which may be attached to seat 12 via a persistent locking mechanism 114. Likewise, a lower support member 106 may be similarly attached to seat 12 via persistent locking mechanism 116. Upper support member 104 and lower support member 106 may be formed of any suitably strong, rigid, and lightweight material such as carbon fiber, a titanium alloy, or an aluminum alloy.

In various embodiments, first arm catcher system 108 may further comprise a network of cables 118 interlaced with upper support member 104 and lower support member 106. In various embodiments, cables 118 may be configured to expand as upper support member 104 and lower support member 106 rotate as first arm catcher system 108 is deployed. As can be observed from FIG. 1, the network of cables 118 discussed above may form a net-like backstop composed of a plurality of shrouds having limited frontal area to limit wind air resistance. In various embodiments, the network of cables 118 forming the backstops of first arm catcher system 108 may be of any suitable material having sufficiently low elongation characteristics such that the force of an individual's arms striking the backstop does not deform the backstop a sufficient distance for the individual's arms to impact the lower support member 106 and upper support member 104. In various embodiments, the network of cables 118 may comprise a woven polyester, nylon, or aramid fiber, for example.

Figure 2A:
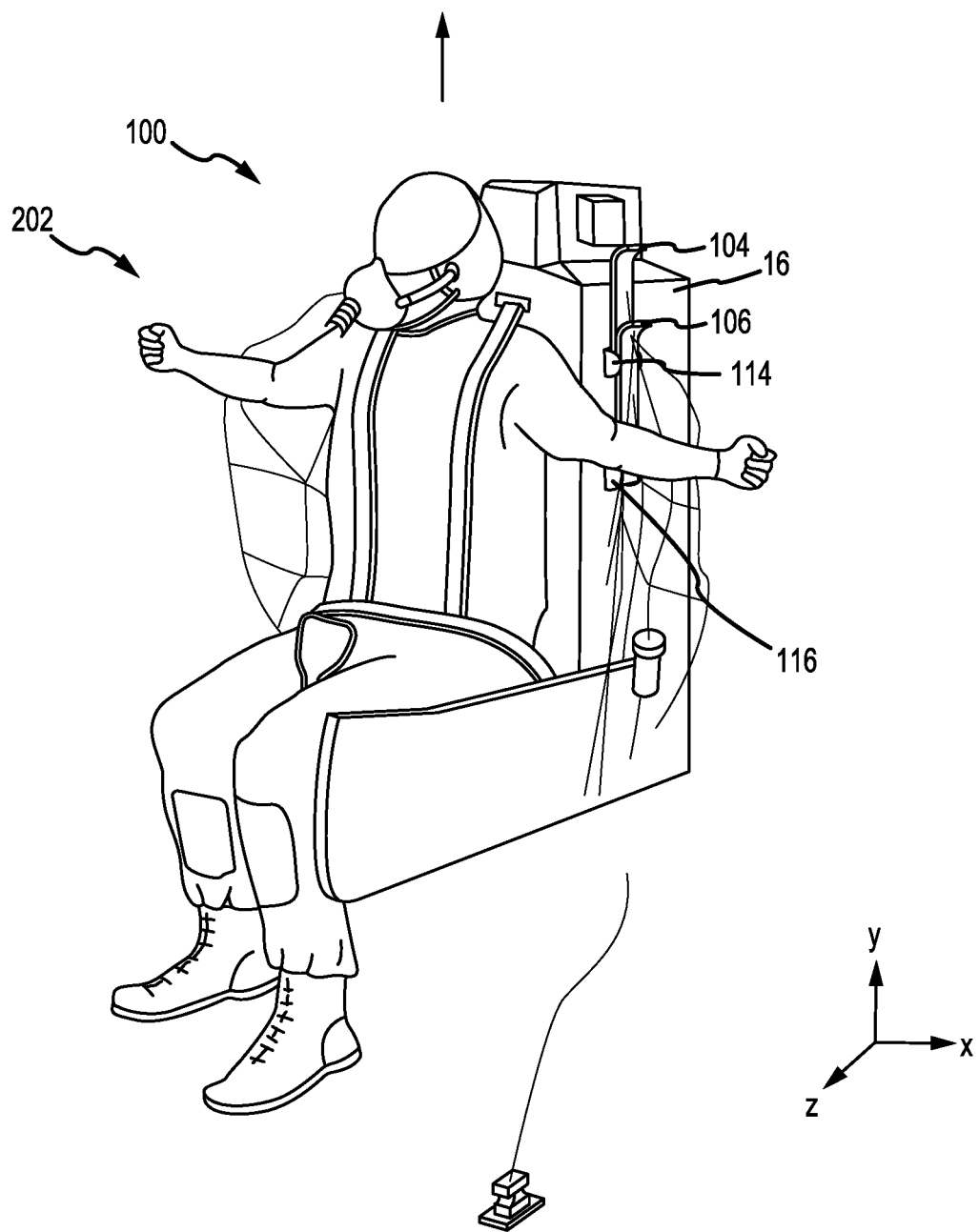
FIG. 2A illustrates a front perspective view of an ejection seat incorporating an arm catcher system in a stowed position, in accordance with various embodiments.
Figure 2B:
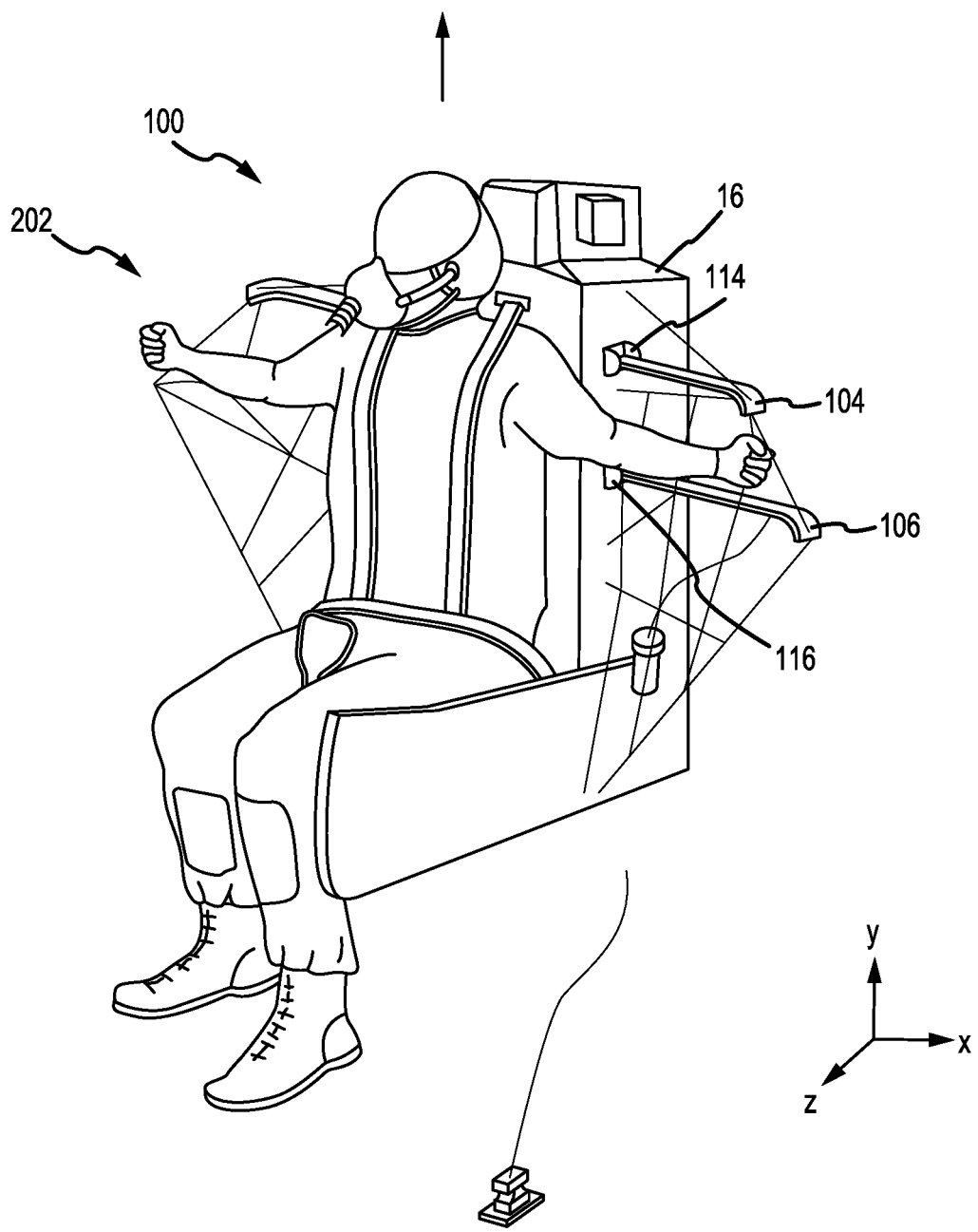
FIG. 2B illustrates a front perspective view of an ejection seat in a deployed position, in accordance with various embodiments.

Referring now to FIGS. 2A and 2B, the operation of ejection seat 100 is discussed. Specifically, with initial reference to FIG. 2A, first arm catcher system 108 is shown in its stowed configuration with upper support member 104 and lower support member 106 folded against seat back portion 16. In the stowed position, upper support member 104 and lower support member 106 may be configured to be oriented along the y-axis, as shown in FIG. 2A.

Returning momentarily to FIG. 1, as ejection seat 100 is propelled out of the aircraft, an attenuator may pull lower support member 106, via, for example, a primary cable of the network of cables 118, causing lower support member 106 to rotate in a clockwise direction (towards the x-axis), pivoting or rotating about persistent locking mechanism 116. In like manner, upper support member 104 may be pulled by one or more cables of the network of cables 118, causing upper support member 104 to rotate in a clockwise direction (towards the x-axis), pivoting or rotating about persistent locking mechanism 114. As shown in FIG. 1, upper support member 104 and lower support member 106 are disposed at an angle of less than 90 degrees with respect seat 12.

Referring now to FIG. 2B, as ejection seat 100 exits, a deployment cable may continue to pull lower support member 106 downward, thereby tensioning the cables that are included in the first arm catcher system 108. It is noted that second arm catcher system 202 is substantially similar to first arm catcher system 108 and would therefore function in a similar manner discussed with reference to first arm catcher system 108. At a predetermined tension, a rip stitch the attenuator may fracture, allowing the deployment cable to separate from the attenuator. At this stage, first arm catcher system 108 may be fully deployed, and, as ejection seat 100 enters the atmosphere surrounding the aircraft, the occupant's (e.g., the pilot's) arms may flail backwards until they impact first arm catcher system 108 and second arm catcher system 202, respectively, which may safely limit the movement of the occupant's arms. It is noted that, in the deployed position, lower support member 106 is rotated in a clockwise direction (towards the x-axis), pivoting or rotating about persistent locking mechanism 116, to a point between about 60 degrees and 120 degrees with respect to seat back portion 16, between about 70 degrees and 100 degrees with respect to seat back portion 16, or between about 85 degrees and 95 degrees with respect to seat back portion 16, wherein the term "about" in this context means+/−three degrees. In like manner, in the deployed position, upper support member 104 may be rotated in a clockwise direction (towards the x-axis), pivoting or rotating about persistent locking mechanism 114 to a point between about 60 degrees and 120 degrees with respect to seat back portion 16, between about 70 degrees and 100 degrees with respect to seat back portion 16, or between about 85 degrees and 95 degrees with respect to seat back portion 16, wherein the term "about" in this context means+/−three degrees.

Referring briefly back to FIG. 1 and FIG. 2A, at some point prior to upper support member 104 and lower support member 106 being fully deployed, contact with canopy 102 may impart forces on upper support member 104 and lower support member 106, for example, forces that tend to cause counterclockwise rotation of upper support member 104 and/or lower support member 106, which would tend to result in upper support member 104 and/or lower support member 106 being forced back into a stowed position against the seat back portion 16. For example, in various situations, such as where canopy 102 is a fracturing canopy, the canopy may not fracture to the degree amenable to providing a clear ejection path for ejection seat 100. As such, upper support member 104 and/or lower support member 106 (and/or the corresponding support members in second arm catcher system 202) may be prone to contact a portion of canopy 102. As such, the persistent locking mechanism 114 and persistent locking mechanism 116 are configured to prevent the various support members from being forced into the stowed configuration. As discussed herein, a first direction may refer to a direction of movement toward the deployed configuration (for example, clockwise about the z-axis as illustrated in FIG. 1-FIG. 2B), while second direction may refer to a direction of movement toward the stowed configuration (for example, counterclockwise about the z-axis as illustrated in FIG. 1-FIG. 2B).

Referring now to FIGS. 3A, 3B, 3C, and 3D, various persistent locking mechanisms are illustrated, in accordance with various embodiments. As previously discussed, a persistent locking mechanism may be coupled to at least one of upper support member 104 and lower support member 106 and be configured to allow the relevant support member to rotate in a first direction in order to be deployed, however, persistently lock the relevant support member from moving in a second direction opposite the first direction. In various embodiments, the second direction may correspond to a direction toward the stowed configuration. As such, a persistent locking mechanism may prevent the relevant support member from being moved to a stowed configuration in response to contacting a portion of an aircraft canopy. In general, the persistent locking mechanism may comprise any suitable structure configured to allow rotation of the relevant support member in the first direction, while persistently preventing movement in the second direction.

Figure 3A:
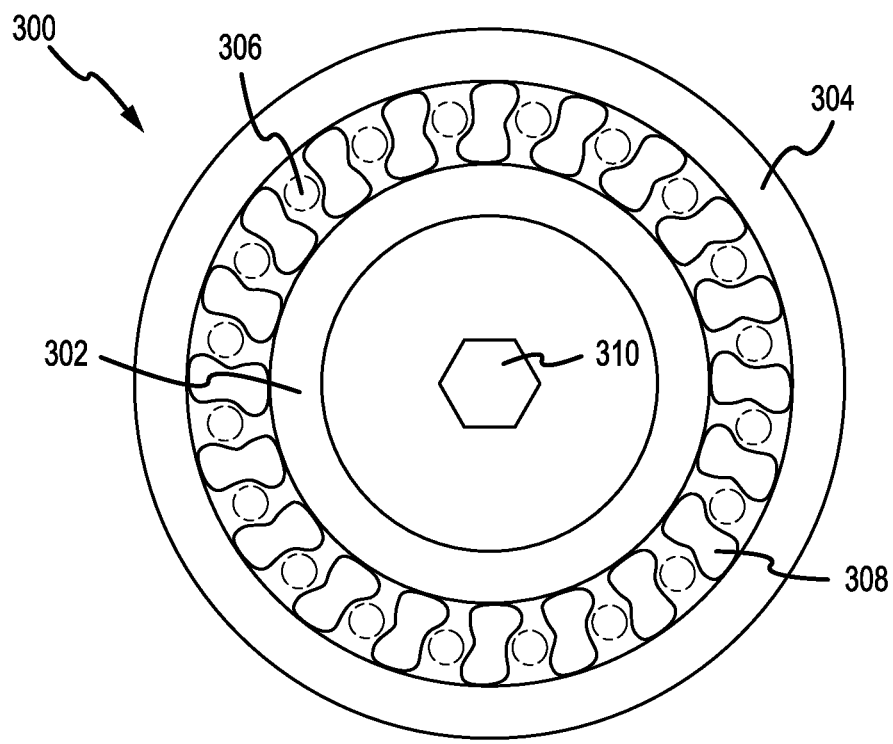
FIGS. 3A, 3B, 3C, and 3D illustrate persistent locking mechanisms decoupled from a support member for an arm catcher system of an ejection seat, in accordance with various embodiments.

For example, in FIG. 3A, persistent locking mechanism 300 is shown. Persistent locking mechanism 300 is a sprag clutch. Aperture 310 is disposed centrally to outer race 304 and inner race 302. Outer race 304 is thus concentric with inner race 302. Sprags 306 are disposed radially between outer race 304 and inner race 302. Sprags 306 are configured to allow rotation of outer race 304 with respect to inner race 302 in a first direction. However, upon exertion of a force directed to rotate outer race 304 in a second direction, where the second direction is opposite the first direction (e.g., counterclockwise second direction vs. clockwise first direction), sprags 306 may tilt or otherwise rotate to extend in a radial direction, thus binding rotation of outer race 304 with respect to inner race 302. In that regard, persistent locking mechanism 300 may be configured to have outer race 304 rotate clockwise (when the sprags 306 slip) but resist or prevent rotation in a clockwise direction (when sprags 306 bind). In that regard, one axial face of persistent locking mechanism 300 may be mounted to seat back portion 16 and the opposite axial face may be mounted to a support member such as upper support member 104 and/or lower support member 106.

Figure 4A:
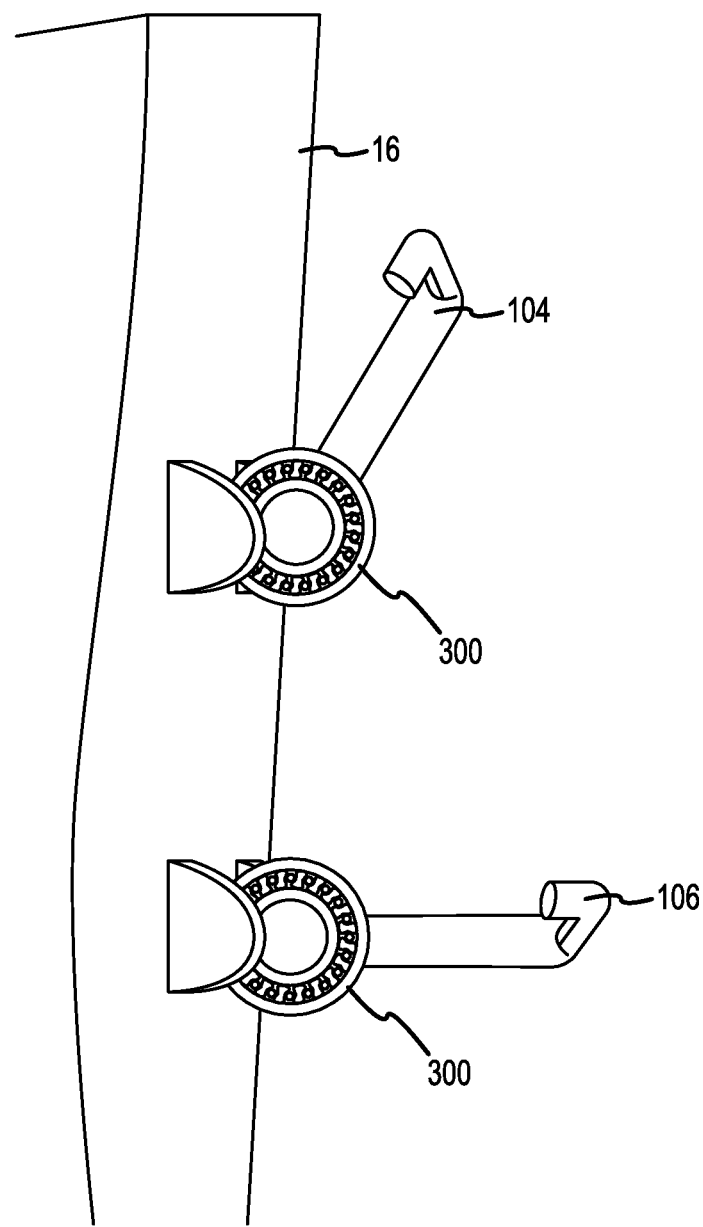
FIGS. 4A, 4B, 4C, and 4D illustrate the persistent locking mechanisms of FIGS. 3A, 3B, 3C, and 3D, respectively, coupled to support members for an arm catcher system of an ejection seat, in accordance with various embodiments.

Referring to FIG. 4A, persistent locking mechanism 300 is shown coupled to upper support member 104, lower support member 106, and seat back portion 16. As previously discussed, persistent locking mechanism 300 may comprise a sprag clutch configured to allow rotation of upper support member 104 and lower support member 106 in a first direction while preventing rotation in a second direction opposite the first direction. One axial face of persistent locking mechanism 300 (such as inner race 302 described with reference to FIG. 3A) may be coupled to seat back portion 16 via a flange integral with and/or detachably coupled with seat back portion 16, while an opposite axial face of persistent locking mechanism 300 (such as outer race 304 described with reference to FIG. 3A) may be coupled to upper support member 104 and lower support member 106. In various embodiments, upper support member 104 and/or lower support member 106 may extend radially outward from a radially outer surface of persistent locking mechanism 300 (such as a radially outer surface of outer race 304 described with reference to FIG. 3A).

Figure 3B:
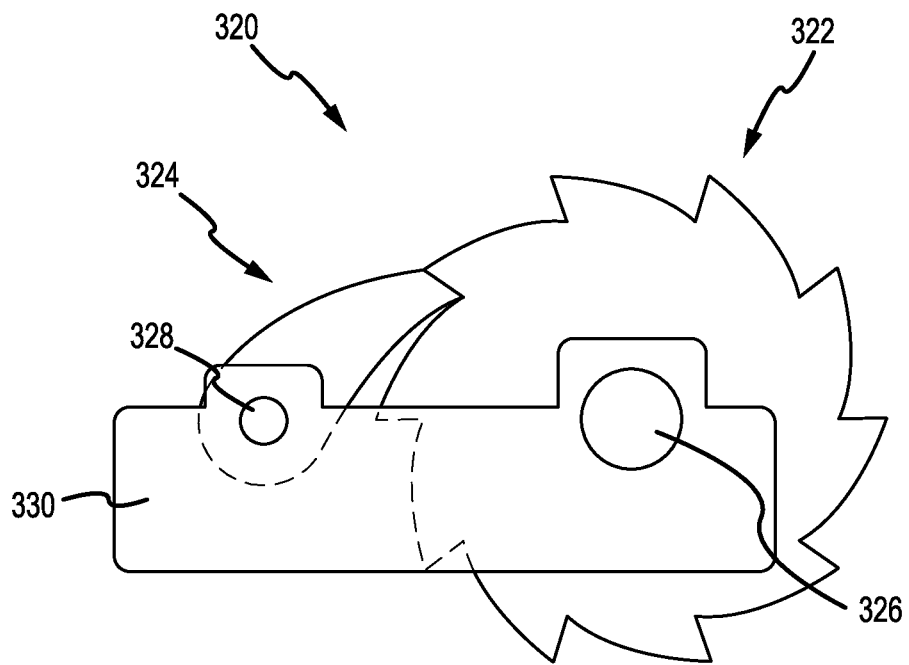
Figure 4B:
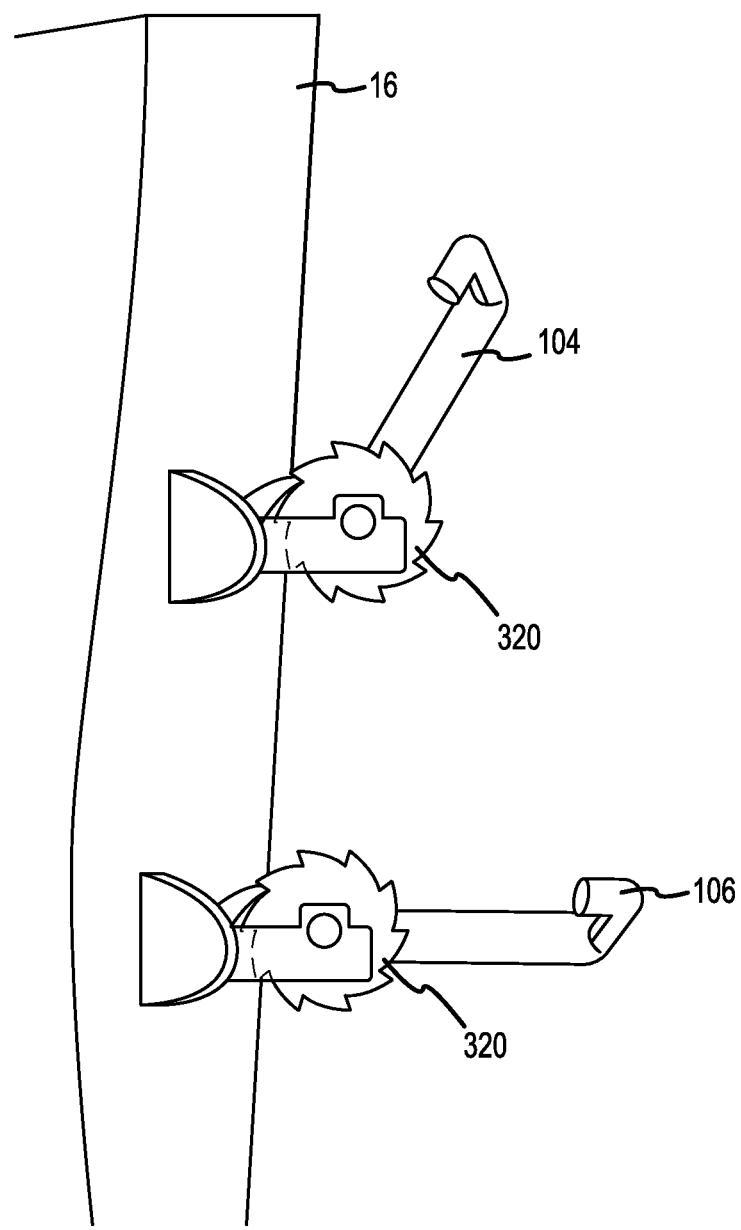

Also for example, in FIG. 3B, persistent locking mechanism 320 is shown. Persistent locking mechanism 320 is a ratchet and pawl device. Pivot axis 326 may be mounted on support 330. Pivot axis 326 may comprise, for example, a pin, boss or detent. Gear 322 may be mounted to pivot axis 326 and be configured to rotate about pivot axis 326. Gear 322 comprises, in various embodiments, asymmetric teeth. Pivot axis 326 may also be mounted on support 330. Pivot axis 326 may comprise, for example, a pin, boss or detent. Pawl 324 is mounted to pivot axis 326 and configured to rotate about pivot axis 326. Pawl 324 may interact with gear 322 while gear 322 is rotating in a first direction, resting on each gear surface as gear 322 rotates. However, upon exertion of a force directed to gear 322 in a second direction, where the second direction is opposite the first direction (e.g., clockwise second direction vs. counterclockwise first direction), pawl 324 may bind against gear 322, thus preventing rotation of gear 322. In that regard, persistent locking mechanism 320 may be configured to have gear 322 rotate counterclockwise (when the pawl 324 rests on gear 322) but resist or prevent rotation in a clockwise direction (when pawl 324 interferes with gear 322). In that regard, support 330 may be mounted to seat back portion 16 and a support member such as upper support member 104 and/or lower support member 106 may be coupled to pivot 326 and/or gear 322. Alternatively, support 330 may be coupled to a support member such as upper support member 104 and/or lower support member 106 and gear 322 may be Referring to FIG. 4B, persistent locking mechanism 320 is shown coupled to upper support member 104, lower support member 106, and seat back portion 16. As previously discussed, persistent locking mechanism 320 may comprise a ratchet and pawl device configured to allow rotation of upper support member 104 and lower support member 106 in a first direction while preventing rotation in a second direction opposite the first direction. In various embodiments, a stationary component of persistent locking mechanism 320 (such as support 330 described with reference to FIG. 3B) may be coupled to seat back portion 16, while a rotatable component of persistent locking mechanism 320 (such as gear 322 described with reference to FIG. 3B) may be coupled to upper support member 104 and/or lower support member 106. In various embodiments, upper support member 104 and lower support member 106 may be coupled to an axial face of the rotatable component (such as gear 322 described with reference to FIG. 3B) or to a radially outer surface of the rotatable component (such as gear 322 described with reference to FIG. 3B). In various embodiments, the gear may comprise the stationary component which may be coupled to seat back portion 16, while the support may be configured to rotate relative to the gear and be coupled to upper support member 104 and/or lower support member 106. In various embodiments, the support and/or gear may be integral with or detachably coupled to seat back portion 16.

Figure 3C:
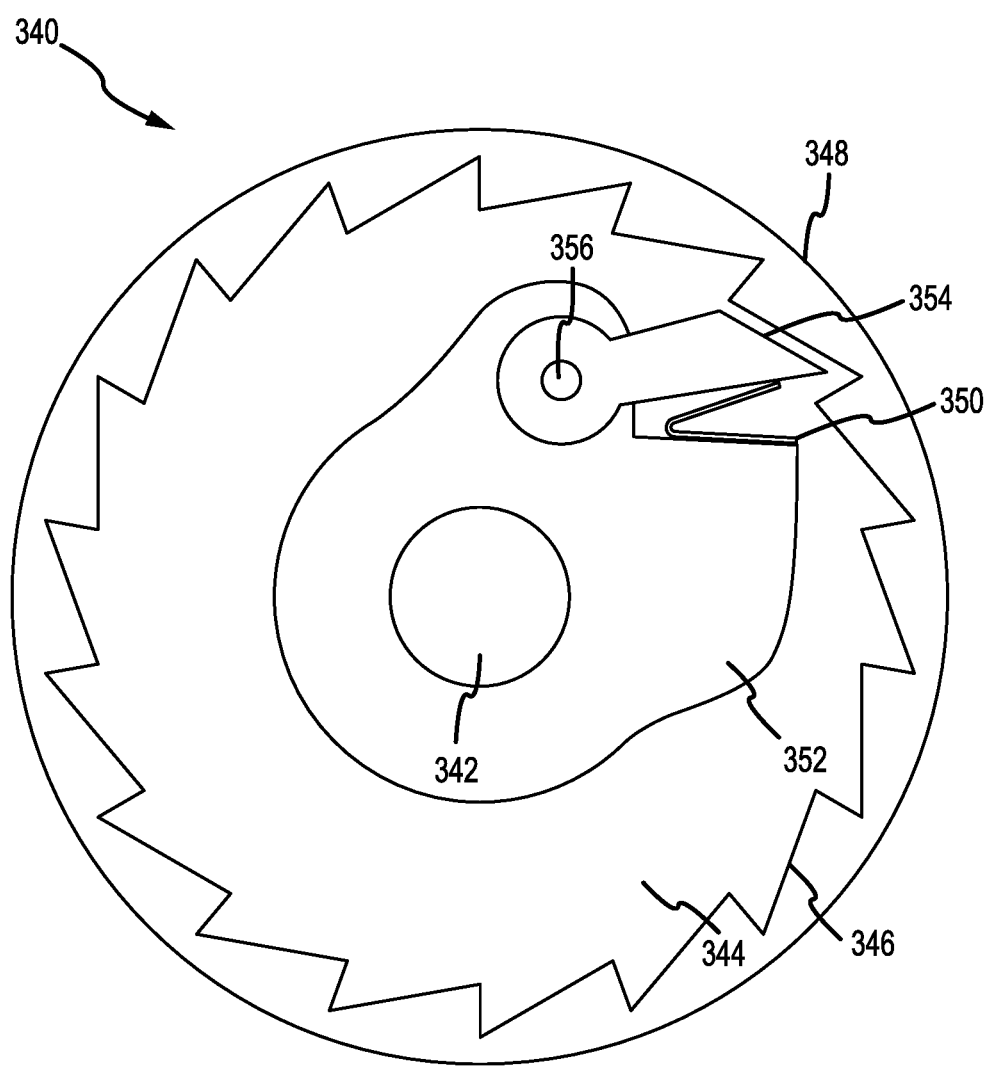

Also for example, in FIG. 3C, persistent locking mechanism 340 is shown. Persistent locking mechanism 340 is a planetary ratchet and pawl device. Central pivot axis 342 may be centrally disposed with respect to gear 344. Central pivot axis 342 may comprise, for example, a pin, boss or detent. Gear 344 may be mounted to central pivot axis 342 and be configured to rotate about central pivot axis 342. Gear 344 comprises, in various embodiments, asymmetric teeth disposed on a radially inward face. Pawl support 352 may be mounted to central pivot axis 342 and fixed against rotation thereto. Stated another way, pawl support 352 may be configured to resist or prevent rotation about central pivot axis 342. Pawl 354 is mounted to pawl support 352 via pivot axis 356 whereby pawl 354 is allowed to rotate about pivot axis 356. Pivot axis 356 may comprise may comprise, for example, a pin, boss or detent. Pawl 354 is biased by biasing member 350. Biasing member 350 may be configured to provide a bias to pawl 354, urging pawl 354 to rotate in a counterclockwise direction. Biasing member 350 may comprise a spring, a leaf spring, a coil spring, a torsion spring, or may comprise various cross sectional geometries, such as a V or U cross sectional geometry. As gear 344 rotates in a clockwise direction, the asymmetric teeth of gear 344 cause pawl 354 to rotate about pivot axis 356 in a clockwise direction, urging compression of biasing member 350. Thus, pawl 354 rotates clockwise until it passes the asymmetric gear tooth of gear 344, at which point biasing member 350 urges rotation of pawl 354 in a counterclockwise direction. In that regard, gear 344 is free to rotate in a clockwise direction. However, upon exertion of a force directed to rotate gear 344 in a counterclockwise direction, pawl 354 may bind against pawl support 346, thus preventing rotation of gear 344. In that regard, persistent locking mechanism 340 may be configured to have gear 344 rotate counterclockwise (when the pawl 354 slides with respect to gear 344) but resist or prevent rotation in a clockwise direction (when pawl 354 interferes with or binds with gear 344). In that regard, central pivot axis 342 may be mounted to seat back portion 16 and a support member such as upper support member 104 and/or lower support member 106 may be coupled to gear 344.

Figure 4C:
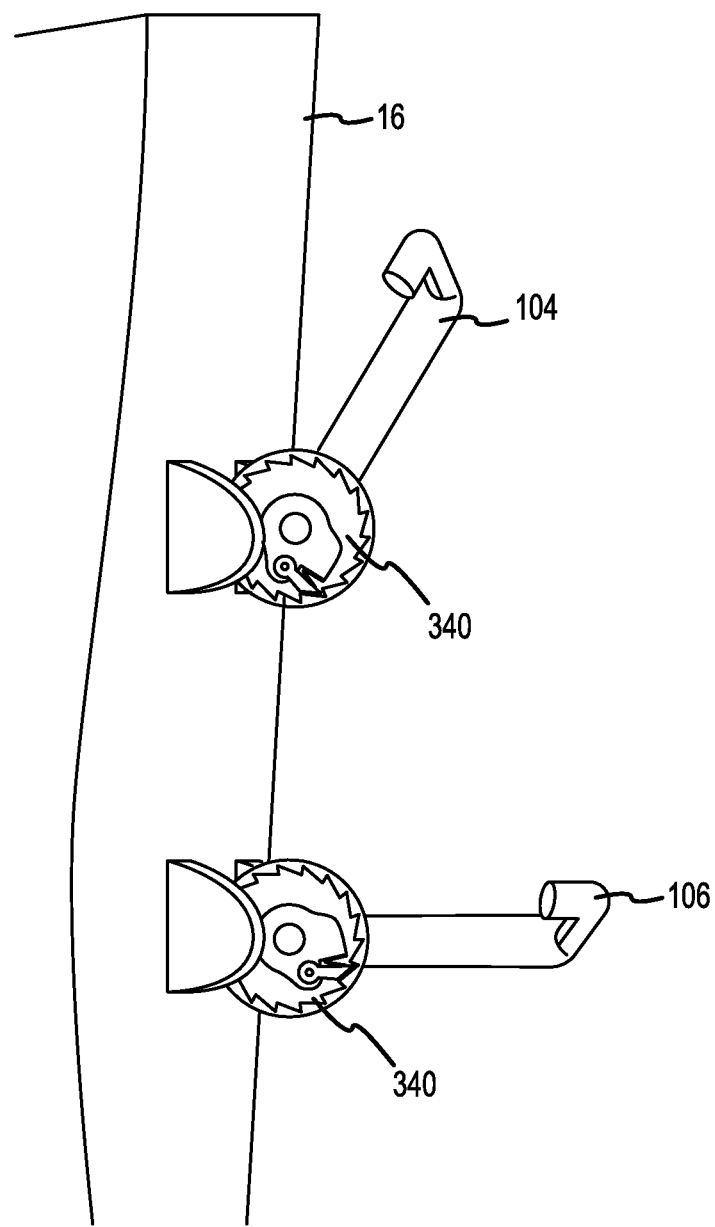

Referring to FIG. 4C, persistent locking mechanism 340 is shown coupled to upper support member 104, lower support member 106, and seat back portion 16. As previously discussed, persistent locking mechanism 340 may comprise a planetary ratchet and pawl device configured to allow rotation of upper support member 104 and lower support member 106 in a first direction while preventing rotation in a second direction opposite the first direction. In various embodiments, a stationary component of persistent locking mechanism 340 (such as central pivot axis 342 described with reference to FIG. 3C) may be coupled to seat back portion 16, while a rotatable component of persistent locking mechanism 340 (such as gear 344 described with reference to FIG. 3C) may be coupled to upper support member 104 and/or lower support member 106. In various embodiments, upper support member 104 and lower support member 106 may be coupled to an axial face of the rotatable component (such as gear 344 described with reference to FIG. 3C) or to a radially outer surface of the rotatable component (such as gear 344 described with reference to FIG. 3C). In various embodiments, the gear may comprise the stationary component which may be coupled to seat back portion 16, while the central pivot axis may be configured to rotate relative to the gear and be coupled to upper support member 104 and/or lower support member 106. In various embodiments, the support and/or gear may be integral with or detachably coupled to seat back portion 16.

Figure 3D:
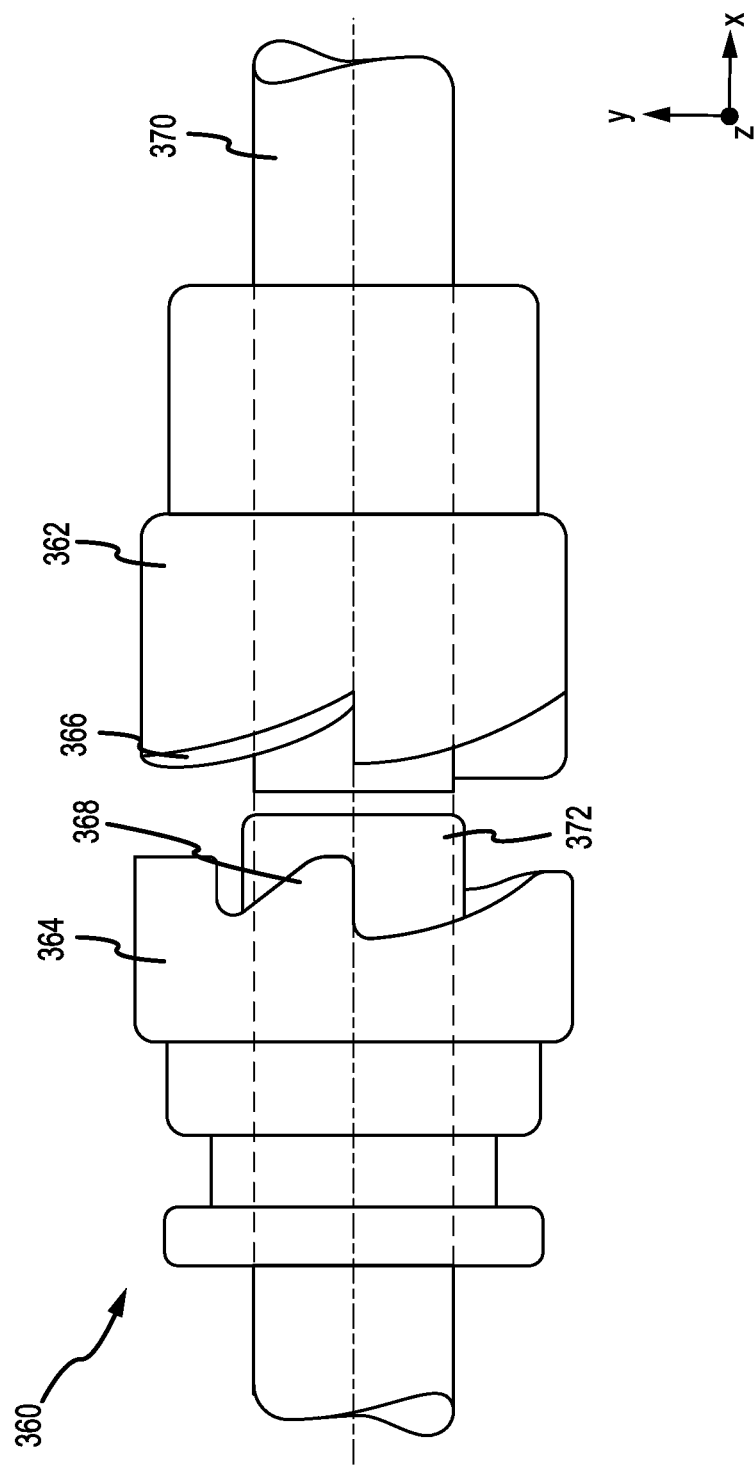

Also for example, in FIG. 3D, persistent locking mechanism 360 is shown. Persistent locking mechanism 360 is a spiral jaw ratchet device. Central rotational axis 370 may be centrally disposed with respect to a first jaw 362. Central sleeve 372 may be centrally disposed with respect to a second jaw 364. Central rotational axis 370 may comprise, for example, a pin, boss or detent. Central sleeve 372 may comprise, for example, a hollow cylindrical element. Central sleeve 372 may comprise an inner diameter surface slightly larger than an outer diameter surface of central rotational axis 370. In that regard, central rotational axis 370 may be configured to be inserted into central sleeve 372 and allow relative rotation between the two components. In various embodiments, first jaw 362 may be configured to rotate and/or stay stationary with central rotational axis 370, while second jaw 364 may be configured to rotate and/or stay stationary with central sleeve 372. In various embodiments, first jaw 362 may comprise a plurality of teeth 366 configured to interlock with teeth 368 of second jaw 364. Teeth 366 and teeth 368 may comprise a geometry suitable for allowing rotational movement between first jaw 362 and second jaw 364 in a first direction but preventing rotational movement between first jaw 362 and second jaw in a second direction opposite the first direction.

For example, as central rotational axis 370 rotates about the x-axis in the positive z-direction, the teeth 366 of first jaw 362 may move past the teeth 368 of second jaw 364. In that regard, central rotational axis 370 and first jaw 362 are free to rotate about the x-axis in the positive z-direction. However, upon exertion of a force directed to rotate central rotational axis 370 about the x-axis in the negative z-direction, teeth 366 of first jaw 362 may bind against teeth 368 of second jaw 364. In that regard, persistent locking mechanism 360 may be configured to have central rotational axis 370 rotate in a first direction (about the x-axis in the positive z-direction) but resist or prevent rotation in a second direction (about the x-axis in the negative z-direction). In that regard, central rotational axis 370 may be mounted to seat back portion 16 and a support member such as upper support member 104 and/or lower support member 106 may be coupled to central sleeve 372.

Figure 4D:
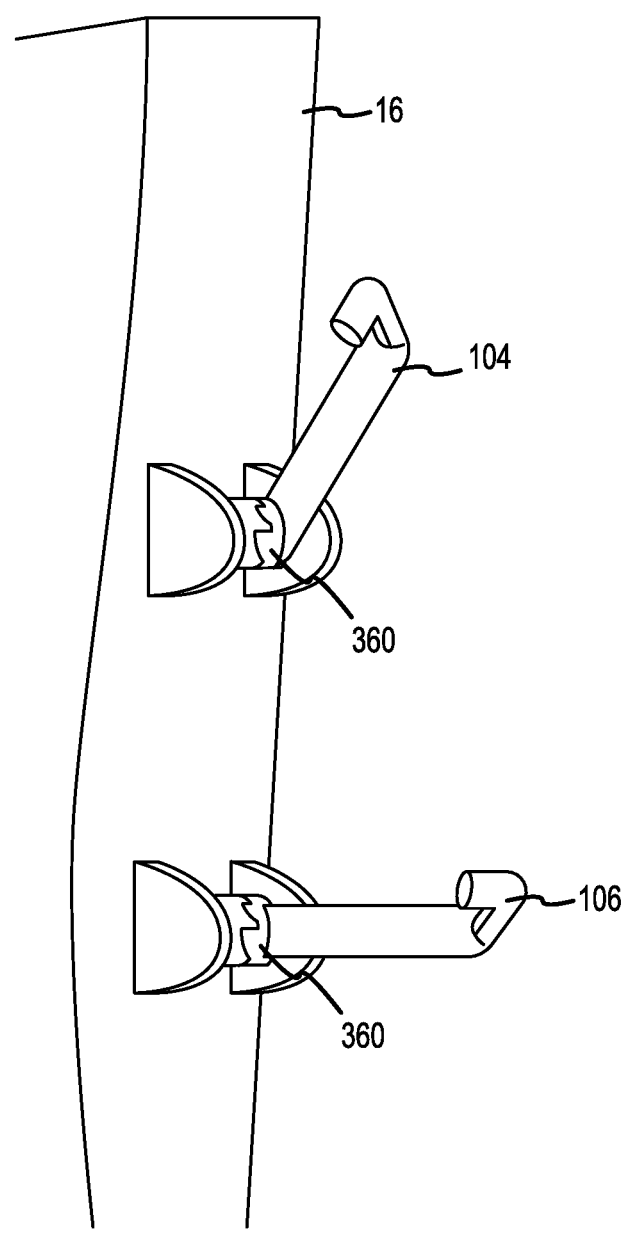

Referring to FIG. 4D, persistent locking mechanism 360 is shown coupled to upper support member 104, lower support member 106, and seat back portion 16. As previously discussed, persistent locking mechanism 340 may comprise spiral jaw ratchet device configured to allow rotation of upper support member 104 and lower support member 106 in a first direction while preventing rotation in a second direction opposite the first direction. In various embodiments, a stationary component of persistent locking mechanism 360 (such as central sleeve 372 described with reference to FIG. 3D) may be coupled to seat back portion 16, while a rotatable component of persistent locking mechanism 360 (such as central rotational axis 370 described with reference to FIG. 3D) may be coupled to upper support member 104 and/or lower support member 106. In various embodiments, upper support member 104 and lower support member 106 may be coupled to an axial face of the rotatable component (such as central rotational axis 370 described with reference to FIG. 3D) or to a radially outer surface of the rotatable component (such as central rotational axis 370 described with reference to FIG. 3D). In various embodiments, the central rotational axis may comprise the stationary component which may be coupled to seat back portion 16, while the central sleeve may be configured to rotate relative to the central rotational axis and be coupled to upper support member 104 and/or lower support member 106. In various embodiments, the central rotational axis and/or central sleeve may be integral with or detachably coupled to seat back portion 16.

Figure 5:
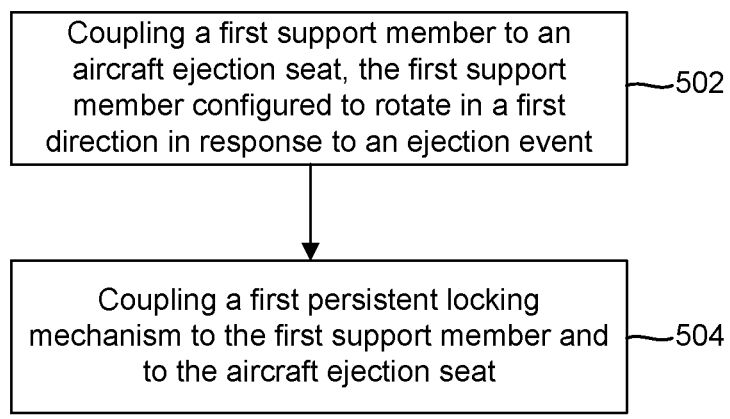
FIG. 5 illustrates a method manufacturing an aircraft ejection seat, in accordance with various embodiments.

With reference now to FIG. 5, a method 500 for manufacturing an aircraft ejection seat is illustrated. In general, the method 500 may comprise coupling a first support member to an aircraft ejection seat, the first support member configured to rotate in a first direction in response to an ejection event (step 502). The method may further comprise coupling a first persistent locking mechanism to the first support member and to the aircraft ejection seat (step 504). In various embodiments, the first persistent locking mechanism configured to allow the first support member to rotate in the first direction and configured to prevent the first support member from rotating in a second direction, the second direction being opposite the first direction.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Methods, systems, and articles media are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An arm catcher system for an aircraft ejection seat, the arm catcher system comprising:
    a first support member configured to rotate in a first direction to be deployed in response to an ejection event;
    a first persistent locking mechanism coupled to the first support member, wherein the first persistent locking mechanism is configured to allow the first support member to rotate in the first direction and configured to prevent the first support member from rotating in a second direction, the second direction being opposite the first direction; and
    a second support member positioned below the first support member, wherein the first support member and the second support member are on a common side of the aircraft election seat.

2. The arm catcher system of claim 1, further comprising a second persistent locking mechanism coupled to the second support member.

3. The arm catcher system of claim 2, further comprising a third support member and a third persistent locking mechanism coupled to the third support member, the third support member positioned on an opposite side of the aircraft ejection seat as the first support member.

4. The arm catcher system of claim 3, further comprising a fourth support member and a fourth persistent locking mechanism coupled to the fourth support member, the fourth support member positioned below the third support member.

5. The arm catcher system of claim 1, wherein the first persistent locking mechanism comprises a sprag clutch.

6. The arm catcher system of claim 1, wherein the first persistent locking mechanism comprises a planetary ratchet and pawl device.

7. The arm catcher system of claim 1, wherein the first persistent locking mechanism comprises a ratchet and pawl device.

8. The arm catcher system of claim 5, wherein the sprag clutch comprises an inner race, an outer race, and a plurality of sprags disposed radially between the inner race and the outer race, wherein the first support member is coupled to the outer race and the inner race is coupled to a seat frame.

9. The arm catcher system of claim 6, wherein the planetary ratchet and pawl device comprises a gear, a pawl support, a pawl, and a biasing member,
    wherein the gear and the pawl support are mounted to a central pivot axis,
    wherein the biasing member is disposed between the pawl support and the pawl,
    wherein the gear is coupled to the first support member and the central pivot axis is mounted to a seat frame.

10. The arm catcher system of claim 7, wherein the ratchet and pawl device comprises a gear, a support, and a pawl,
    wherein the gear is mounted to a pivot axis of the support,
    wherein the pawl is mounted to a second pivot axis of the support,
    wherein the gear is coupled to the first support member and the support is mounted to a seat frame.

11. An aircraft ejection seat comprising:
    a seat frame; and
    an arm catcher system associated with the seat frame, the arm catcher system comprising:
    a first support member configured to rotate in a first direction to be deployed in response to an ejection event;
    a first persistent locking mechanism coupled to the first support member, wherein the first persistent locking mechanism is configured to allow the first support member to rotate in the first direction and configured to prevent the first support member from rotating in a second direction, the second direction being opposite the first direction, the first persistent locking mechanism coupled to the seat frame; and
    a second support member positioned below the first support member, wherein the first support member and the second support member are on a common side of the aircraft ejection seat.

12. The aircraft ejection seat of claim 11, further comprising a second persistent locking mechanism coupled to the second support member.

13. The aircraft ejection seat of claim 11, wherein the first persistent locking mechanism comprises a sprag clutch.

14. The aircraft ejection seat of claim 11, wherein the first persistent locking mechanism comprises a planetary ratchet and pawl device.

15. The aircraft ejection seat of claim 11, wherein the first persistent locking mechanism comprises a ratchet and pawl device.

16. The aircraft ejection seat of claim 13, wherein the sprag clutch comprises an inner race, an outer race, and a plurality of sprags disposed radially between the inner race and the outer race, wherein the first support member is coupled to the outer race and the inner race is coupled to a seat frame.

17. The aircraft ejection seat of claim 14, wherein the planetary ratchet and pawl device comprises a gear, a pawl support, a pawl, and a biasing member,
    wherein the gear and the pawl support are mounted to a central pivot axis,
    wherein the biasing member is disposed between the pawl support and the pawl,
    wherein the gear is coupled to the first support member and the central pivot axis is mounted to a seat frame.

18. The aircraft ejection seat of claim 15, wherein the ratchet and pawl device comprises a gear, a support, and a pawl,
    wherein the gear is mounted to a pivot axis of the support,
    wherein the pawl is mounted to a second pivot axis of the support,
    wherein the gear is coupled to the first support member and the support is mounted to a seat frame.

19. A method for manufacturing an aircraft ejection seat, the method comprising:
    coupling a first support member of a first arm catcher system to the aircraft ejection seat, the first support member configured to rotate in a first direction in response to an ejection event;
    coupling a first persistent locking mechanism to the first support member and to the aircraft ejection seat, the first persistent locking mechanism configured to allow the first support member to rotate in the first direction and configured to prevent the first support member from rotating in a second direction, the second direction being opposite the first direction; and
    coupling a second support member of the first arm catcher system to the aircraft ejection seat, wherein the first support member and the second support member are on a common side of the aircraft ejection seat and with the second support arm being positioned below the first support arm.

20. The method of claim 19, wherein the first persistent locking mechanism comprises a sprag clutch.

* * * * *